(12) United States Patent
Bertrand

(10) Patent No.: US 9,409,340 B2
(45) Date of Patent: Aug. 9, 2016

(54) METHOD FOR COOLING PLASTIC FILM TUBE IN BLOWN FILM PROCESS

(71) Applicant: Poly-America, L.P., Grand Prairie, TX (US)

(72) Inventor: Anthony H. Bertrand, Mansfield, TX (US)

(73) Assignee: Poly-America, L.P., Grand Prairie, TX (US)

( * ) Notice: Subject to any disclaimer, the term of this patent is extended or adjusted under 35 U.S.C. 154(b) by 0 days.

(21) Appl. No.: 14/924,295

(22) Filed: Oct. 27, 2015

(65) Prior Publication Data

US 2016/0046057 A1 Feb. 18, 2016

Related U.S. Application Data

(63) Continuation of application No. 14/244,210, filed on Apr. 3, 2014, now Pat. No. 9,193,107.

(51) Int. Cl.
| | |
|---|---|
| *B29C 47/88* | (2006.01) |
| *B29C 47/00* | (2006.01) |
| *B29C 47/08* | (2006.01) |
| *B29C 47/92* | (2006.01) |
| *B29L 23/00* | (2006.01) |

(52) U.S. Cl.
CPC ......... *B29C 47/8885* (2013.01); *B29C 47/0021* (2013.01); *B29C 47/0026* (2013.01); *B29C 47/0057* (2013.01); *B29C 47/0811* (2013.01); *B29C 47/8825* (2013.01); *B29C 47/8835* (2013.01); *B29C 47/92* (2013.01); *B29C 2947/926* (2013.01); *B29C 2947/92209* (2013.01); *B29C 2947/92704* (2013.01); *B29C 2947/92971* (2013.01); *B29K 2023/06* (2013.01); *B29L 2023/001* (2013.01)

(58) Field of Classification Search
CPC ............ B29C 47/0026; B29C 47/0057; B29C 47/8825; B29C 47/883; B29C 47/8835
See application file for complete search history.

(56) References Cited

U.S. PATENT DOCUMENTS

| | | | | |
|---|---|---|---|---|
| 2,461,976 | A * | 2/1949 | Schenk ............... | B29C 47/8835 156/244.14 |
| 3,576,929 | A * | 4/1971 | Turner et al. ........ | B29C 47/8835 264/237 |
| 4,115,047 | A * | 9/1978 | Stelmack ............ | B29C 47/8825 264/28 |
| 4,434,129 | A * | 2/1984 | Bose ................... | B29C 47/8825 264/557 |
| 6,068,462 | A * | 5/2000 | Wybenga ............ | B29C 47/0026 425/326.1 |
| 7,883,327 | B2 * | 2/2011 | Fahling ............... | B29C 47/0026 425/326.1 |

* cited by examiner

*Primary Examiner* — Yogendra Gupta
*Assistant Examiner* — Joseph Leyson
(74) *Attorney, Agent, or Firm* — Daniel J. Layden; Brandon J. Lee

(57) ABSTRACT

The present invention is directed to an apparatus for differential cooling of a plastic film tube. The apparatus and method includes the use of a blown film extrusion die that extrudes a plastic film tube upward. An air cooling system applies cooling air across one or more surfaces of the plastic film tube. One or more throttling valves are coupled to a pressurization pump that provides a pressurized working fluid, preferably water. The throttling valves are positioned to project the pressurized working fluid from outlets of the throttling valves towards circular arcs of the plastic film tube, the circular arcs of the plastic film tube being less than the circumference of the plastic film tube to provide a blown film tubular plastic film with controlled gauge variation.

13 Claims, 3 Drawing Sheets

Figure 1:
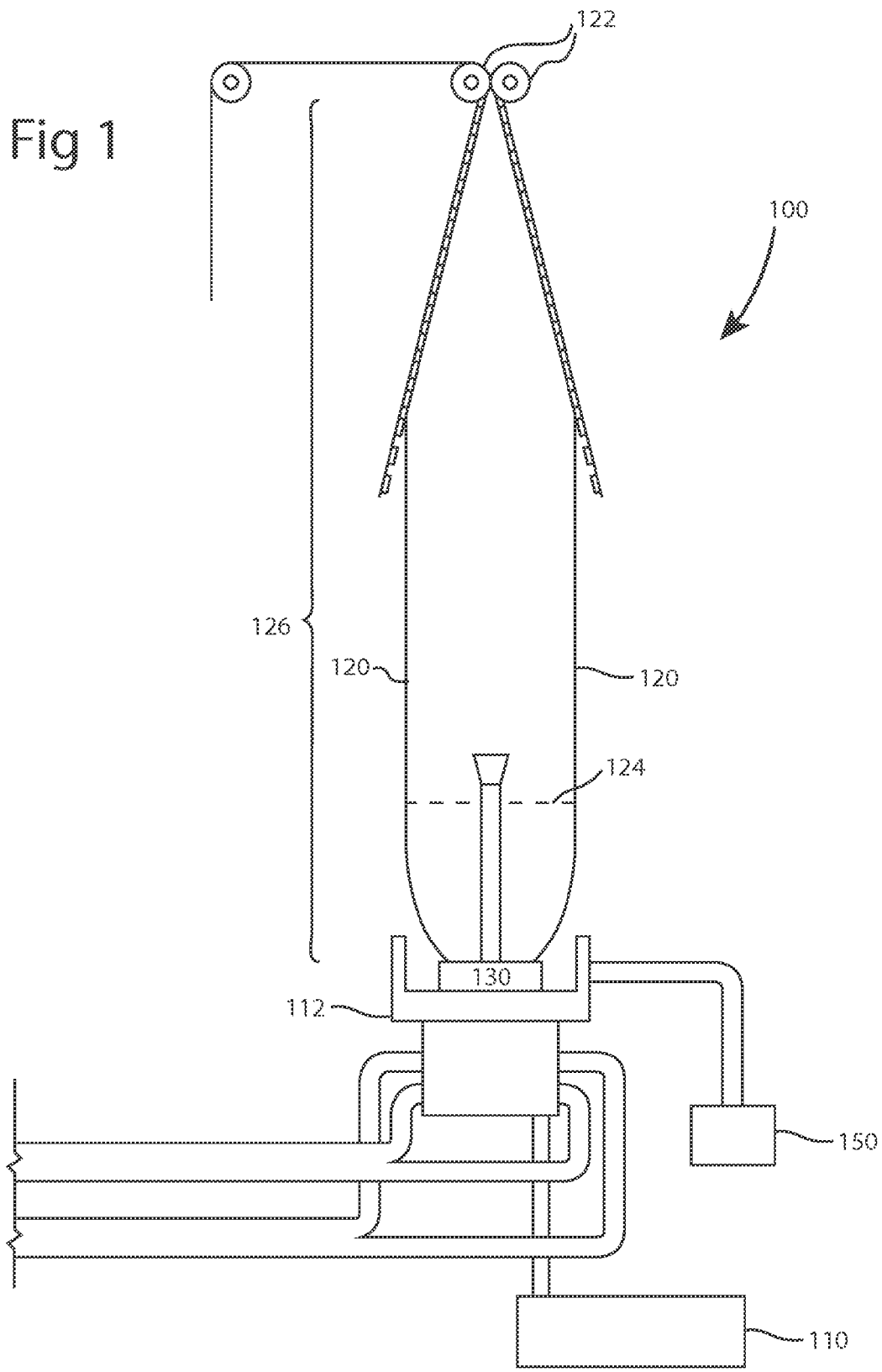

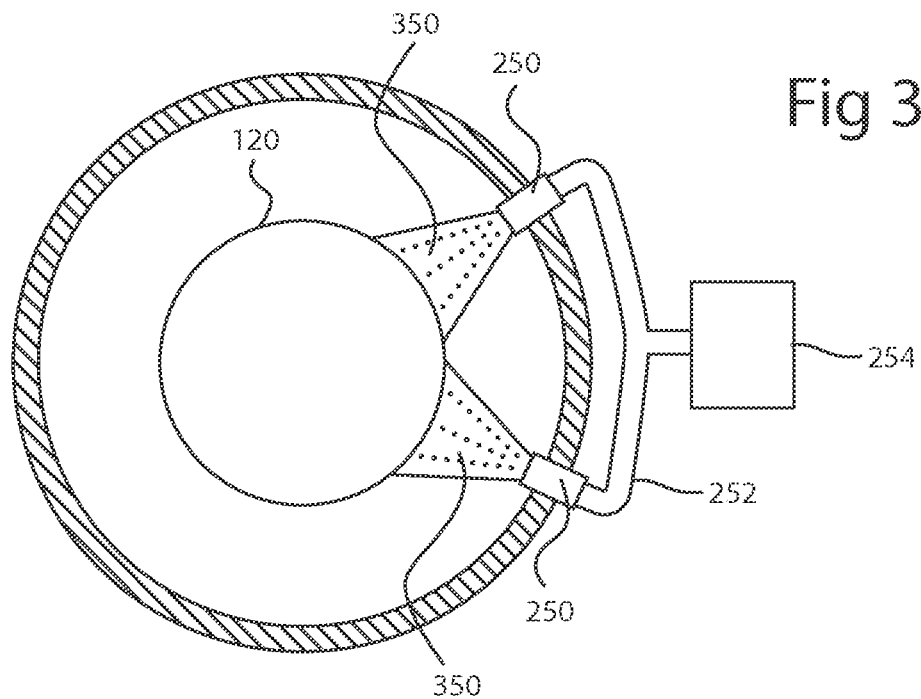
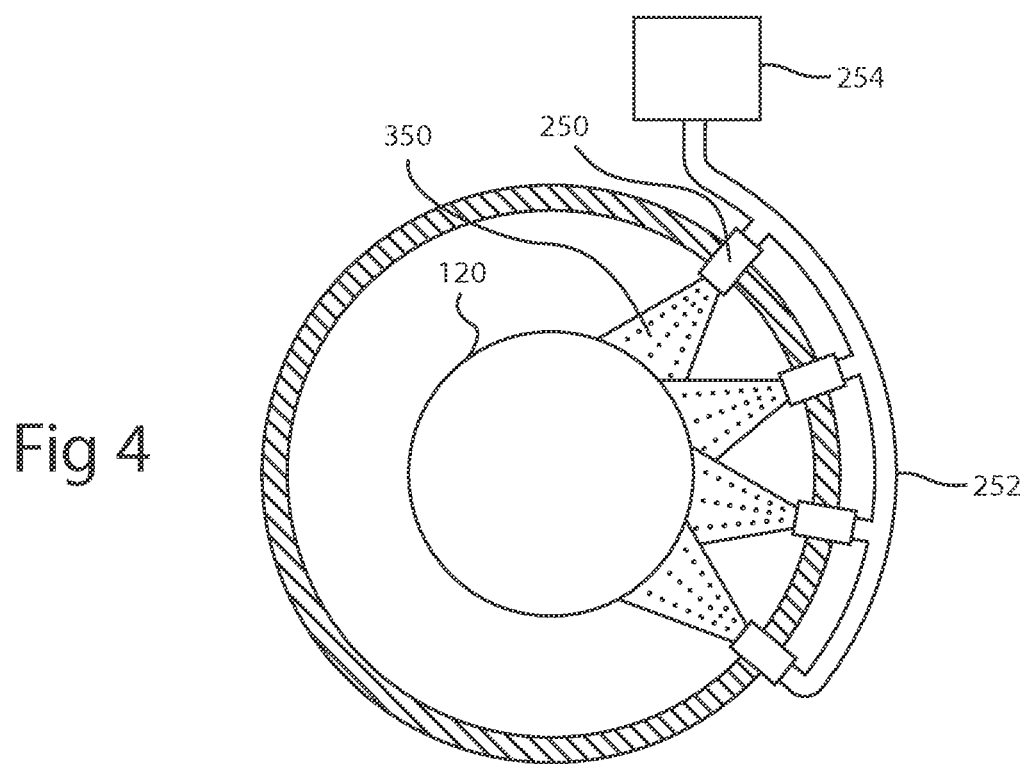

METHOD FOR COOLING PLASTIC FILM TUBE IN BLOWN FILM PROCESS

CROSS-REFERENCE TO RELATED APPLICATIONS

This application is a continuation of application Ser. No. 14/244,210, filed Apr. 3, 2014, and is hereby incorporated by reference into this disclosure.

BACKGROUND OF THE INVENTION

1. Field of the Invention

This invention relates generally to an apparatus and method for cooling a plastic film tube. More particularly, this invention relates to an apparatus and method for cooling a molten plastic film tube exiting the outlet of an extrusion die in a blown film process by using evaporative cooling.

2. Description of the Related Art

Thin plastic film may be produced, in addition to other manufacturing methods, by extruding plastic material, such as polyethylene resin, in a process known as blown film extrusion. In blown film extrusion, polyethylene resin is fed into an extruder where an extrusion screw pushes the resin through the extruder. The extrusion screw compresses the polyethylene, heating the resin into a molten state under high pressure. The molten, pressurized polyethylene is fed through a blown film extrusion die having an annular opening. As the molten material is pushed into and through the extrusion die, a plastic film tube emerges from the outlet of the extrusion die.

The plastic film tube is blown or expanded to a larger diameter by providing a volume of air within the interior of the plastic film tube. The combination of the volume of air and the plastic film tube is commonly referred to as a bubble between the extrusion die and a set of nip rollers. The plastic film tube is commonly cooled by one or more external air rings applying a constant flow of air upward along the outside of the plastic film tube. A number of factors including, but not limited to, the air pressure within the bubble of the plastic film tube, the cooling rate provided by the air ring, the temperature and flow of material out of the extrusion die, and the rate at which the plastic film tube is pulled by the nip rollers impact the blow-up ratio, diameter of the plastic film tube, and the ultimate thickness or gauge of the plastic film tube.

As the plastic film tube cools travelling upward toward the nip rollers, the plastic film tube solidifies from a molten state to a solid state after it expands to its final diameter and thickness. The point along the bubble where the plastic film solidifies is known as the frost line. Consequently, the portion of the bubble below the frost line is molten allowing for expansion and thinning of the plastic film tube. Conversely, the portion of the bubble above the frost line has solidified and the diameter and thickness of the plastic film tube is generally fixed at that point.

Improved cooling of the plastic film increases the stability of the bubble, thereby allowing for more accurate control of the physical properties of the plastic film tube and for a broader range of plastic film tube diameters and thicknesses. To facilitate better cooling, it is known in the art to use an internal bubble cooling, or IBC, assembly to dissipate heat from within the interior of the bubble. Without an IBC assembly, the bubble contains a static volume of air applying outward pressure on the plastic film tube but there is no avenue to dissipate the heat absorbed by the static volume of air from the plastic film tube. Consequently, the interior air volume quickly settles at approximately the same temperature as the plastic film tube, providing no cooling benefit. Internal bubble cooling assemblies exchange the warm air within the bubble with cooler air while maintaining a constant pressure. The cooled air within the bubble absorbs heat from the interior surface of the bubble, cooling the plastic film tube more quickly and lowering the frost line for increased bubble stability.

U.S. Pat. No. 7,753,666 issued to Greg Wood and is entitled Apparatus and Method for Cooling Plastic Film Tube in Blown Film Process (hereafter, "the Wood patent"). The Wood patent describes an improved internal bubble cooling assembly using particular air ring assemblies. The internal air ring assemblies improve the flow of the cooled air within the bubble to provide improved bubble stability and allow for improved properties of the plastic film tube. The teachings and specification of the Wood patent are incorporated herein by reference.

Extruded tubular film, even with improved cooling, still has variations in the gauge or thickness of the film around the circumference from variations in the extrusion die. Consequently, the thickness of the film is typically reflected as an average thickness, or more precisely, a mean thickness based upon several measurements. However, even for films of a particular mean thickness, it is desirable to minimize the variations in thickness around the circumference of the tubular film as much as possible during the manufacturing process. By reducing variations in film thickness, there are fewer thin or weak areas on the film, which improve the overall strength and performance of the film since the thin regions represent common points of failure for plastic film products. There are several methods known in the art for achieving more uniform thickness around the circumference of the tubular film.

U.S. Pat. No. 4,339,404 issued to Hartmut Upmeier et al. and is entitled Method of Controlling the Film Thickness at a Blown Film Installation (hereafter, "the Upmeier patent"). The Upmeier patent discloses a method for providing a more uniform thickness distribution for a tubular film as is generally desired. The disclosed method, and system, uses microprocessors and sensors to determine control command for sectors of cooling or heating.

Although extensive efforts have been directed to achieve more uniform thickness in blown film extrusion, in order to realize certain product characteristics there have also been some efforts made to intentionally disrupt gauge uniformity. U.S. Pat. No. 6,139,186 issued to Robert W. Fraser and is entitled Bag Having Improved Tie Features (hereafter, "the Fraser patent"). The Fraser patent discloses a film formed by blown film extrusion with increased air cooling from the annular air ring where additional thickness is desired. Specifically, the Fraser patent discloses increased cooling in the blown film to provide thicker localized areas which can be generated by profiling the annular air ring opening at the areas where the additional thickness is desired.

However, the method disclosed by the Fraser patent is not ideal for all situations. The increased air cooling described by the Fraser patent requires permanent modification or profiling of the annular air ring. Thus, the resulting annular air ring of the Fraser patent is only suitable for use in the manufacture of tubular plastic film with the same gauge characteristics and profile. In addition to the foregoing limitations, the permanent modification of the annular air ring does not allow for controlling processing parameters due to changes in ambient manufacturing conditions such as temperature or humidity.

Another method known in the art for intentionally introducing gauge variations in tubular plastic film is to provide a secondary, external source of air to supplement the cooling provided by the annular air ring. For example, an additional air nozzle might be directed onto the bubble to provide additional cooling capacity. While the additional air nozzle may be utilized to provide such gauge variations in certain situations, the method also has certain disadvantages. The introduction of additional air along the cooling bubble can significantly impact the air flow around the bubble, the relative air pressure around the bubble, and can unpredictably change the flow of air around the cooling bubble of plastic film. As a result, bubble stability can be adversely affected and, by extension, the properties of the resultant film can be negatively impacted as well.

In view of the foregoing, it would be desirable to provide a method of providing controlled variations of film thickness in a plastic tubular film that does not significantly impact the air flow and air pressures around the plastic tubular film. It would also be desirable to provide a method for allowing for controlled cooling of the plastic film tube to induce thickness variation that does not require permanent modification of the manufacturing equipment, can be adjusted for different film properties or changes in ambient manufacturing conditions, and that can be quickly and easily enabled and disabled. The present invention addresses these needs.

SUMMARY OF THE INVENTION

The present invention is directed to an apparatus for differential cooling of a plastic film tube. In one embodiment of the present invention, the apparatus and method includes the use of a blown film extrusion die, wherein a plastic film tube is extruded upwardly out of the blown film extrusion die. Also provided is an air cooling system that applies cooling air across one or more surfaces of the plastic film tube. A first throttling valve is coupled to a pressurization pump. The pressurization pump supplies a pressurized working fluid to the first throttling valve. The first throttling valve is positioned to project the pressurized working fluid from an outlet of the first throttling valve towards a first circular arc of the plastic film tube. The first circular arc of the plastic film tube is less than the circumference of the plastic film tube.

In some embodiments, at least a portion of the pressurized working fluid evaporates after exiting the outlet of the first throttling valve. Evaporation occurs prior to contact with the plastic film tube. Moreover, evaporation of the pressurized working fluid decreases an air temperature adjacent the circular arc of the plastic film tube. The result is a mean film thickness of the plastic film along the first circular arc of the plastic film being at least 25% greater than a mean film thickness of the plastic film tube along the circumference of the plastic film tube excluding the first circular arc.

In some embodiments of the present invention, the pressurized working fluid is water. Moreover, in certain embodiments of the present invention, the air cooling system is provided having at least one external air ring. Additionally, in some embodiments an internal bubble cooling system may be provided with the internal bubble cooling system located generally within the plastic film tube. Furthermore, certain embodiments of the present invention may further include a first evaporative cooling field generated by the evaporation of the pressurized working fluid.

A subset of embodiments of the present invention may further include a second throttling valve coupled to the pressurization pump where the pressurization pump supplies the pressurized working fluid to the second throttling valve. Additionally, the second throttling valve may be positioned to project the pressurized working fluid from an outlet of the second throttling valve towards a second circular arc of the plastic film tube, the second circular arc of the plastic film tube being less than the circumference of the plastic film tube. Furthermore, in such embodiments, at least a portion of the pressurized working fluid evaporates after exiting the outlet of the second throttling valve. Evaporation occurs prior to contact with the plastic film tube. The evaporation of the pressurized working fluid decreases an air temperature adjacent the second circular arc of the plastic film tube. This increases the gauge of the plastic film tube along the second circular arc of the plastic film tube.

In some embodiments, a first evaporative cooling field may be generated by the evaporation of the pressurized working fluid. Additionally, a second evaporative cooling field may be generated by the evaporation of the pressurized working fluid. In some cases, the first evaporative cooling field and the second evaporative cooling field overlap while, in other cases, the first evaporative cooling field and the second evaporative cooling field are distinct. Additionally, some embodiments of the present invention may include a vertical support structure positioned above the blown-film ring and surrounding the plastic film tube and a first iris coupled to the vertical support structure above the first throttling valve.

BRIEF DESCRIPTION OF THE RELATED DRAWINGS

A full and complete understanding of the present invention may be obtained by reference to the detailed description of the present invention and described embodiments when viewed with reference to the accompanying drawings. The drawings can be briefly described as follows.

FIG. 1 provides an elevation view of a manufacturing process for a plastic film tube according to one embodiment of the present invention.

Figure 2:
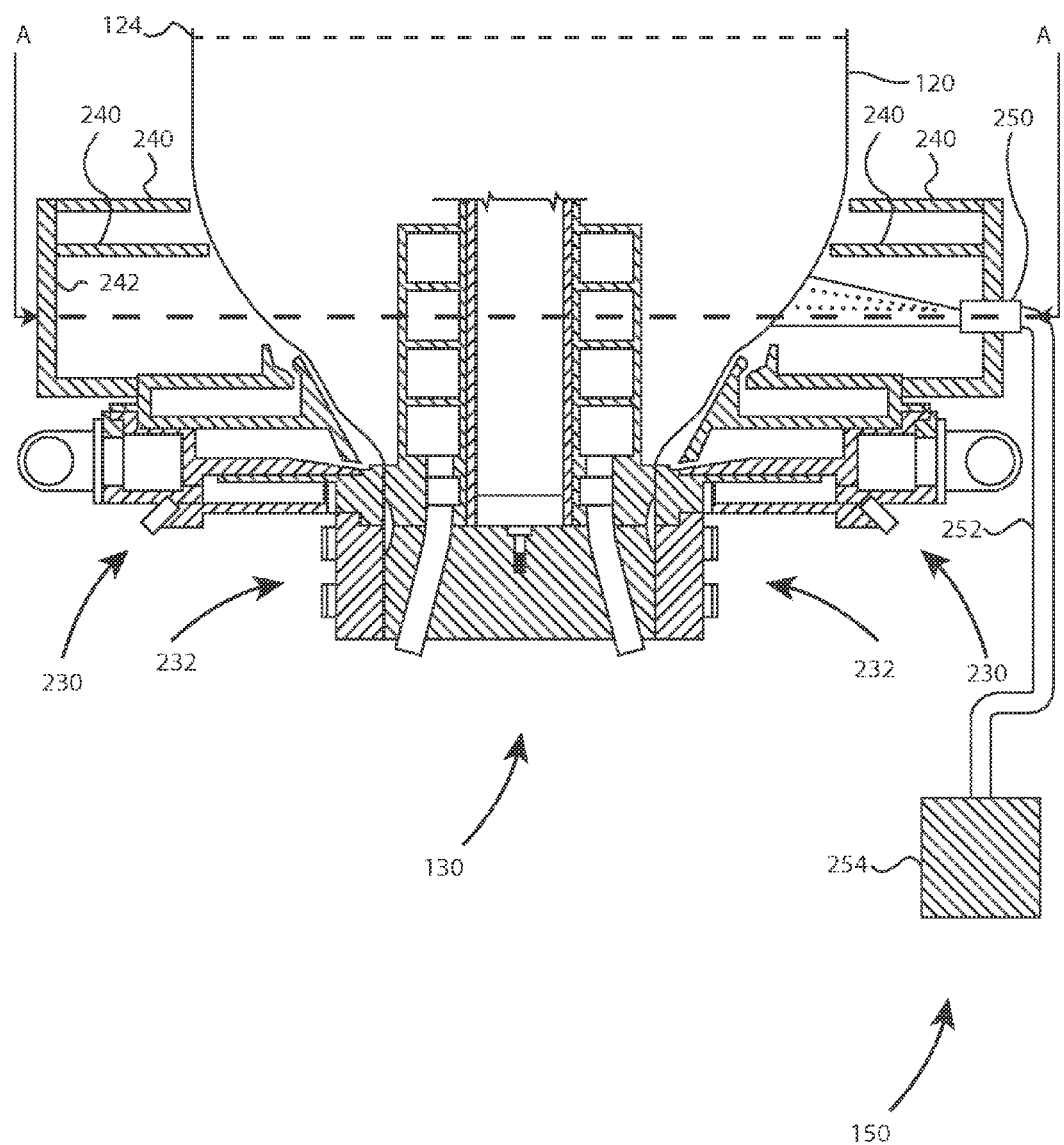

FIG. 2 provides a cross-section elevation view of the blown-film extrusion die and extruded plastic film tube below the frost line according to one embodiment of the present invention.

FIG. 3 provides a cross-sectional plan view of a manufacturing process for a plastic film tube according to one embodiment of the present invention.

FIG. 4 provides a cross-sectional plan view of a manufacturing process for a plastic film tube according to another embodiment of the present invention.

DETAILED DESCRIPTION OF THE INVENTION

The present disclosure illustrates one or more embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms is not intended to conclusively limit the scope of protection.

FIG. 1 illustrates an overview of a system 100, according to one embodiment of the present invention, for producing plastic film utilizing a blown film extrusion process. Polyethylene resin, in the form of pellets, is fed into an extruder 110. The pellets are heated in the extruder 110 until the polyethylene resin is molten. The molten material is fed under pressure through an extrusion die 112 having an annular opening. As the molten material is extruded from the extrusion die 112, a plastic film tube 120 emerges.

The plastic film tube 120 is blown or expanded to a larger diameter due, in part, to the internal air pressure within the bubble 126. The portion of the plastic film tube 120 between the outlet of the extrusion die 112 and a set of nip rollers 122 is referred to as a bubble. The internal air pressure within the air bubble 126 applies outward pressure on the plastic film tube 120. As the plastic film tube 120 rises, it cools, solidifying from a molten state to a solid state as it expands to its final diameter and thickness. The lower portion of the plastic film tube 120 below the frost line 124 is generally molten while the upper portion of the plastic film tube 120 above the frost line 124 is solid. Controlling, among other factors, the air pressure within the interior of the plastic film tube 120, the cooling rate provided by the air cooling system 130, the speed of the nip rollers 122, and the amount of resin pushed through the extrusion die 112, the plastic film tube 120 is blown to a desired diameter and thickness. Most importantly, embodiments of the present invention include an evaporative cooling system 150 to facilitate the cooling of the air near the surface of the plastic film tube 120, particularly the air expelled by the exterior portions of the air cooling system 130.

FIG. 2 provides a larger view of an embodiment of the present invention. The plastic film tube 120 is primarily cooled by an air cooling system 130. In the depicted embodiment, the air cooling system comprises one or more external air rings 230 surrounding the exterior of the plastic film tube 120 and directing a flow of air onto the outer surface of the plastic film tube 120 to facilitate cooling. In some embodiments, the air cooling system 130 may also comprise an internal bubble cooling system 232 that facilitates the cooling of the air volume within the plastic film tube 120. In certain embodiments, one or more irises 240 are provided surrounding the plastic film tube 120 at or below the frost line 124. The irises 240 are supported by a vertical support structure 242 and may be opened and closed to act as baffles, allowing for more precise control of the air along the plastic film tube 120.

In a preferred embodiment of the present invention, an evaporative cooling system 150 comprises one or more throttling valves or nozzles 250 provided around a portion of the circumference of the plastic film tube 120. Each throttling valve 250 is coupled by a supply line 252 to a pressurization pump 254. The pressurization pump 254 provides a pressurized working fluid through the supply line 252 to the one or more throttling valves 250. As the pressurized working fluid passes through the one or more throttling valves 250, the pressurized working fluid is expelled as a fog of particles, preferably an aerosol. Depending on the relative humidity and other environmental factors, a portion of the expelled working fluid evaporates due to the drop in pressure after exiting the one or more throttling valves 250. The evaporation of the expelled working fluid absorbs heat and causes evaporative cooling or a decrease in the temperature of the air between the throttling nozzles 250 and the plastic film tube 120. Preferably, a substantial portion of the expelled working fluid evaporates before reaching the plastic film tube 120 without actually impacting the plastic film tube 120. As a result, the air immediately adjacent to the plastic film tube 120 may be cooled without significantly impacting the flow of air around the plastic film tube 120. Consequently, the cooler air caused by the evaporation of the expelled working fluid causes the portion of the plastic film tube 120 adjacent the cooler air to cool slightly quicker than the remaining portion of the plastic film tube 120, causing that portion of the plastic film tube 120 to be generally slightly thicker than the remaining portions of the plastic film tube 120. Additionally, the frost line 124 in that region may be lower than in the remaining portions of the plastic film tube 120. In a preferred embodiment, the pressurized working fluid is water, but other pressurized working fluids may be utilized for improved cooling.

FIG. 3 depicts a cross-sectional elevation view of a first embodiment of the present invention along line A-A as depicted in FIG. 2. In the depicted embodiment, a first and second throttle nozzle 250 are located approximately 75 degrees apart and each throttle nozzle 250 is configured and oriented to provide an evaporative cooling field 350 covering an approximately 75 degree circular arc of the plastic film tube 120. The evaporative cooling field 350 results from the pressurized working fluid being expelled through the throttling valves 250. Specifically, the decrease in pressure as the pressurized working fluid exits the throttling valves 250 causes at least a portion of the pressurized working fluid to evaporate. As the pressurized working fluid evaporates, the evaporative cooling causes a decrease in the air temperature within the evaporative cooling field 350. The combination of the two throttle nozzles 250 cools an approximately 150 degree circular arc of the plastic film tube 120.

FIG. 4 depicts a cross sectional elevation view of a second embodiment of the present invention along line A-A as depicted in FIG. 2. As shown, four throttle nozzles 250 are located approximately 35 degrees apart from each other, each throttling nozzle 250 configured and oriented to provide an evaporative cooling field 350 covering an approximately 45 degree circular arc of the plastic film tube 120. Consequently, the evaporative cooling field 350 from each of the throttling nozzles 250 may overlap in some embodiments.

I claim:

1. A method of differential cooling for increasing a film thickness along a first circular arc of a plastic film tube comprising:
   extruding a plastic film tube out of a blown film extrusion die,
   applying cooling air from an air cooling system across one or more surfaces of the plastic film tube,
   supplying a pressurized working fluid to one or more throttling valves,
   positioning the one or more throttling valves to project the pressurized working fluid towards the first circular arc of a first circumference of the plastic film tube and not to project the pressurized working fluid towards a remainder of the first circumference of the plastic film tube that excludes the first circular arc, and
   the method devoid of positioning any throttle valve to project pressurized working fluid towards the remainder.

2. The method of claim 1 further comprising:
   at least a portion of the pressurized working fluid evaporating after exiting the one or more throttling valves and prior to contact with the plastic film tube,
   wherein evaporation of the pressurized working fluid decreases an air temperature adjacent the circular arc of the plastic film tube thereby resulting in a mean film thickness of the plastic film along the first circular arc of the plastic film being at least 25% greater than a mean film thickness of the plastic film tube along the first circumference of the plastic film tube excluding the first circular arc.

3. The method of claim 1, further comprising:
   the pressurized working fluid is water.

4. The method of claim 1, further comprising:
the air cooling system comprising at least one external air ring.

5. The method of claim 4, further comprising:
internally cooling the plastic film tube with an internal bubble cooling system.

6. The method of claim 2, further comprising:
generating a first evaporative cooling field by evaporation of the pressurized working fluid.

7. The method of claim 1, further comprising:
positioning a vertical support structure above the blown film extrusion die and surrounding the plastic film tube, and
coupling a first iris to the vertical support structure above the one or more throttling valves.

8. A method of differential cooling for increasing a film thickness along a first circular arc of a plastic film tube comprising:
extruding a plastic film tube out of a blown film extrusion die,
applying cooling air from an air cooling system across one or more surfaces of the plastic film tube,
supplying a pressurized working fluid to one or more throttling valves,
positioning the one or more throttling valves to project the pressurized working fluid towards the first circular arc of the plastic film tube, the first circular arc of the plastic film tube less than a first circumference of the plastic film tube,
positioning the one or more throttling valves to not project the pressurized working fluid towards a remainder of the first circumference of the plastic film tube that excludes the first circular arc,
at least a portion of the pressurized working fluid evaporating after exiting the one or more throttling valves and prior to contact with the plastic film tube,
wherein evaporation of the pressurized working fluid decreases an air temperature adjacent the first circular arc of the plastic film tube, and
the method devoid of positioning any throttle valve to project pressurized working fluid towards the remainder.

9. The method of claim 8, further comprising:
the pressurized working fluid is water.

10. The method of claim 9, further comprising:
the air cooling system comprising at least one external air ring.

11. The method of claim 10, further comprising:
internally cooling the plastic film tube with an internal bubble cooling system located generally within the plastic film tube.

12. The method of claim 8, further comprising:
generating a first evaporative cooling field by evaporation of the pressurized working fluid.

13. The method of claim 8, further comprising:
positioning a vertical support structure above the blown film extrusion die and surrounding the plastic film tube, and
coupling a first iris to the vertical support structure above the one or more throttling valves.

* * * * *